United States Patent
Kerai

(10) Patent No.: US 10,863,468 B1
(45) Date of Patent: Dec. 8, 2020

(54) BLE SYSTEM WITH SLAVE TO SLAVE COMMUNICATION

(71) Applicant: Dialog Semiconductor B.V., 's-Hertogenbosch (NL)

(72) Inventor: Kanji Kerai, London (GB)

(73) Assignee: Dialog Semiconductor B.V., 's-Hertogenbosch (NL)

(*) Notice: Subject to any disclaimer, the term of this patent is extended or adjusted under 35 U.S.C. 154(b) by 0 days.

(21) Appl. No.: 17/004,621

(22) Filed: Aug. 27, 2020

Related U.S. Application Data

(63) Continuation of application No. 16/183,014, filed on Nov. 7, 2018.

(51) Int. Cl.
*H04W 56/00* (2009.01)
*H04L 7/00* (2006.01)
*H04R 25/00* (2006.01)

(52) U.S. Cl.
CPC ....... *H04W 56/0015* (2013.01); *H04L 7/0033* (2013.01); *H04R 25/554* (2013.01); *H04R 2225/55* (2013.01)

(58) Field of Classification Search
CPC ............. H04W 56/0015; H04L 7/0033; H04R 2225/55; H04R 25/554
See application file for complete search history.

(56) References Cited

U.S. PATENT DOCUMENTS

| | | | |
|---|---|---|---|
| 2011/0129048 A1* | 6/2011 | Barbe | H04W 56/0015 375/371 |
| 2011/0164597 A1* | 7/2011 | Amini | H04L 27/2627 370/338 |
| 2012/0328061 A1* | 12/2012 | Chow | H04W 4/80 375/354 |
| 2014/0169599 A1* | 6/2014 | Solum | H04R 25/505 381/315 |
| 2014/0328210 A1* | 11/2014 | Knaappila | H04W 4/80 370/254 |
| 2015/0010179 A1* | 1/2015 | Solum | H04R 25/554 381/315 |
| 2015/0382304 A1* | 12/2015 | Park | H04W 52/0248 455/41.2 |
| 2016/0249356 A1* | 8/2016 | Pope | H04L 65/601 |
| 2016/0366263 A1* | 12/2016 | Song | H04W 4/80 |
| 2018/0213345 A1* | 7/2018 | Mate | G06F 3/162 |
| 2019/0045304 A1* | 2/2019 | Bhalla | H04R 3/00 |
| 2020/0112934 A1* | 4/2020 | Kondareddy | H04J 3/0644 |

* cited by examiner

*Primary Examiner* — Lewis G West
(74) *Attorney, Agent, or Firm* — Saile Ackerman LLC; Stephen B. Ackerman

(57) ABSTRACT

A method of communication in a Bluetooth Low Energy network is presented. The network has a master device and a plurality of slave devices between a first slave device and a second slave device. The method steps include: sending from the master device to the first slave device a synchronisation delay parameter; and sending from the master device to the second slave device the synchronisation delay parameter and a relative offset parameter. At the second slave device, the method steps include determining a synchronisation time point by adding the relative offset parameter to the synchronisation delay parameter. At the synchronisation time point, the method steps include waking the first and second slave devices and sending a communication from the first slave device to the second slave device.

14 Claims, 2 Drawing Sheets

BLE SYSTEM WITH SLAVE TO SLAVE COMMUNICATION

This application is a Continuation application of Ser. No. 16/183,014, filed on Nov. 7, 2018, which is hereby incorporated by reference in its entirety, and owned by a common owner.

TECHNICAL FIELD

The present invention relates to wireless communication systems. In particular, but not exclusively, the present invention relates to Bluetooth Low Energy (BLE) systems which support slave to slave communication.

BACKGROUND

A popular protocol for wireless connectivity is Bluetooth. A recent version of this is the BLE standard, also referred to as Bluetooth Smart. Its operation is defined by various standards and specifications which are managed by the Bluetooth Special Interest Group.

The BLE standard defines two device roles at the Link Layer for a connection: the master device and the slave device. These are the devices that act as initiator and advertiser respectively during creation of the connection. A master device can manage multiple simultaneous connections with different slave devices. Thus, a network, called a piconet, can be formed which comprises a master device and multiple slave devices in a point-to-multipoint star topology. Each slave device in the piconet is time synchronized to the clock of the master device. Time synchronization enables the devices to go to sleep in between connections and, when they wake up again, the radios of the devices are synchronized and the data transfer between the master and the slave devices can continue.

Communication is always between a master and the slave. The BLE standard does not support any direct communication between the slaves. If one slave wants to send a message to another slave, the slave must first send the message to the master and then the master must forward that message to the recipient slave. This requires a complex protocol and the solution is complex and higher power.

There are many practical applications where slave to slave communication is desirable. For example, hearing aid manufacturers would like to adapt their hearing aids so that they can communicate wirelessly with electronic devices such as smart phones, music systems, PCs, TVs and so on. This is effectively a network in which the electronic devices are the master device and each hearing aid is a slave device. To be compatible with a wide range of makes and models of these electronic devices requires a non-proprietary and ubiquitous method of communication such as BLE.

However, the manufacturers also wish to be able to directly transmit data and/or audio between the two hearing aids for a number of reasons. For example, each hearing aid may have two or three microphones and by monitoring the signal received from each microphone the gain in each microphone can be adjusted to direct the incoming sound. Or, using multiple microphones, the background noise can be monitored accurately, and audio processing can cancel the background noise. Or the transmission between the two hearing aids may be for the synchronization of modes of operation as the user enters and leaves different sound environments, such as from a party with high background noise to a large empty hall.

Conventionally, the manufacturers typically use proprietary wireless technology for communication between two hearing aids. The technology is typically either Near Field Magnetic Induction (NFMI) technology or wireless radio communication at 2.4 GHz frequency. This requires additional components and protocols which increases costs.

Therefore, hearing aid manufacturers would like to use BLE for communication with BLE compatible electronic devices but would also like to use BLE for communication between the two hearing aids (slave to slave communication). However, in a conventional BLE network, each slave device is unaware of the connection timings of any other slave devices.

SUMMARY

It is desirable to provide slave to slave communication in a BLE network without violating the BLE standard. According to a first aspect of the present disclosure there is provided a method of communication in a Bluetooth Low Energy (BLE) network comprising a master device and a plurality of slave devices between a first slave device and a second slave device, the method comprising the steps of:

sending from the master device to the first slave device a synchronisation delay parameter;

sending from the master device to the second slave device the synchronisation delay parameter and a relative offset parameter;

at the second slave device, determining a synchronisation time point by adding the relative offset parameter to the synchronisation delay parameter;

at the synchronisation time point, waking the first and second slave devices and sending a communication from the first slave device to the second slave device.

Optionally, the method includes subsequently sending a communication from the second slave device to the first slave device.

Optionally, the method includes establishing a common connection interval for the master device and the first and second slave devices.

Optionally, the method includes setting the synchronisation delay parameter such that it occurs at a latter stage of the connection interval.

Optionally, the method includes determining a synchronisation time point for each subsequent connection interval.

Optionally, the method includes sending from the master device to the first slave device the synchronisation delay parameter during connection of the master device and the first slave device.

Optionally, the method includes sending from the master device to the first slave device a relative offset parameter. Optionally, the relative offset parameter sent to the first slave device is set to zero.

Optionally, the method includes sending from the master device to the second slave device the synchronisation delay parameter and a relative offset parameter during connection of the master device and the second slave device. Optionally, the relative offset parameter sent to the second slave device is set to a non-zero value.

Optionally, if a slave device receives a relative offset parameter which is set to zero, the slave device is adapted to adopt a pseudo-master role.

Optionally, the communication sent from the first slave device to the second slave device comprises data.

Optionally, the communication sent from the first slave device to the second slave device comprises audio.

Optionally, the first slave device comprises a speaker. Optionally, the first slave device comprises a hearing aid device.

Optionally, the second slave device comprises a speaker. Optionally, the second slave device comprises a hearing aid device.

According to a second aspect of the present disclosure there is provided a Bluetooth Low Energy (BLE) network comprising a master device and a plurality of slave devices, wherein:

the master device is adapted to send to the first slave device a synchronisation delay parameter;

the master device is further adapted to send to the second slave device the synchronisation delay parameter and a relative offset parameter;

the second slave device is adapted to determine a synchronisation time point by adding the relative offset parameter to the synchronisation delay parameter; and at the synchronisation time point, the first and second slave devices and adapted to wake and the first slave device is adapted to send a communication to the second slave device.

Optionally, the second slave device is adapted to subsequently send a communication to the first slave device.

Optionally, the master device is adapted to set the synchronisation delay parameter such that it occurs at a latter stage of an established connection interval.

Optionally, the master device is adapted to send to the first slave device the synchronisation delay parameter during connection of the master device and the first slave device.

Optionally, the master device is adapted to send to the first slave device a relative offset parameter. Optionally, the relative offset parameter sent to the first slave device is set to zero.

Optionally, the master device is adapted to send to the second slave device the synchronisation delay parameter and a relative offset parameter during connection of the master device and the second slave device. Optionally, the relative offset parameter sent to the second slave device is set to a non-zero value.

Optionally, if a slave device receives a relative offset parameter which is set to zero, the slave device is adapted to adopt a pseudo-master role.

Optionally, the communication sent from the first slave device to the second slave device comprises data.

Optionally, the communication sent from the first slave device to the second slave device comprises audio.

Optionally, the first slave device comprises a speaker. Optionally, the first slave device comprises a hearing aid device.

Optionally, the second slave device comprises a speaker. Optionally, the second slave device comprises a hearing aid device.

BRIEF DESCRIPTION OF THE DRAWINGS

The invention will be described below, by way of example only, with reference to the accompanying drawings, in which.

DESCRIPTION

Figure 1:
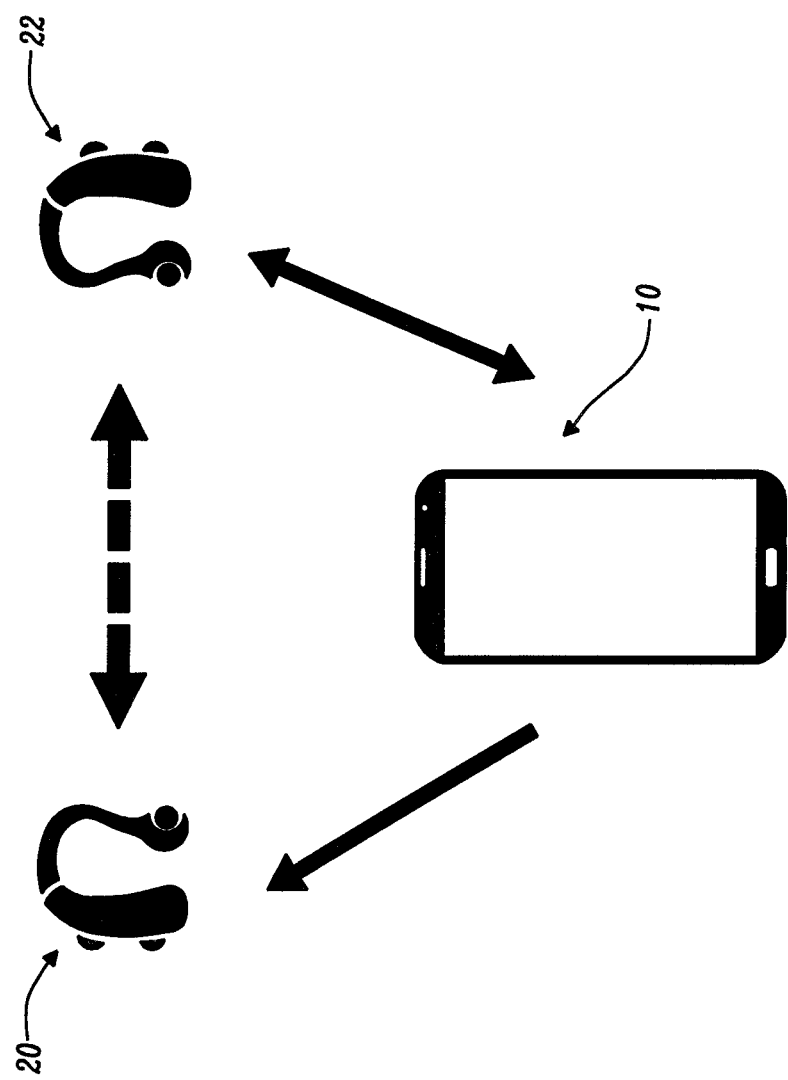
FIG. 1 is a schematic view of a BLE network.

FIG. 1 shows a mobile phone 10, a first hearing aid 20 and a second hearing aid 22. Each of these devices is BLE enabled and are connectable over a BLE network.

A BLE device may operate in different modes depending on required functionality. In order to establish a connection, one device has to be in advertising mode (and allow for a connection) and the other device in Initiator mode. The initiator scans for a desirable device-advertising packet and consequently sends a connection request. Once a connection is established, the initiator assumes the role of master device and the advertiser becomes a Slave device. Slave devices may have only one connection at a time, while master devices may have multiple connections with different slave devices simultaneously. This asymmetrical approach allows slave devices to be very small in the sense of resources and hardware cost.

When a connection is established, the initiator device (which will become a master device) supplies the advertising device (which will become a slave device) with a set of critical data defining the channel and timing of the master-slave data exchange. In particular, this data specifies the connection interval parameter. The connection interval determines the time between the start of the data packet exchange sequence called connection events.

During a connection event, the master and slave alternate sending and receiving packets until either side stops sending packets. The start of a connection event is called an anchor point. At the anchor point, a master starts to transmit a Data Channel PDU to the slave.

The present disclosure provides a method of communication between slave devices in a BLE network.

In the embodiment of FIG. 1, the mobile phone 10 is the initiator device and it becomes the master device when connected to the first hearing aid 20, which becomes a slave device. The mobile phone 10 also becomes the master device when connected to the second hearing aid 22, which also becomes a slave device. Under the BLE protocol, the two hearing aids, both slave devices, are synchronised using the clock of the master device but are unaware of the communication timings of each other.

The mobile phone 10 sends conventional BLE communication parameters to each hearing aid, including the connection interval parameter to be used. In addition, the mobile phone 10 sends a synchronisation delay parameter and a relative offset parameter to each hearing aid.

Figure 2:
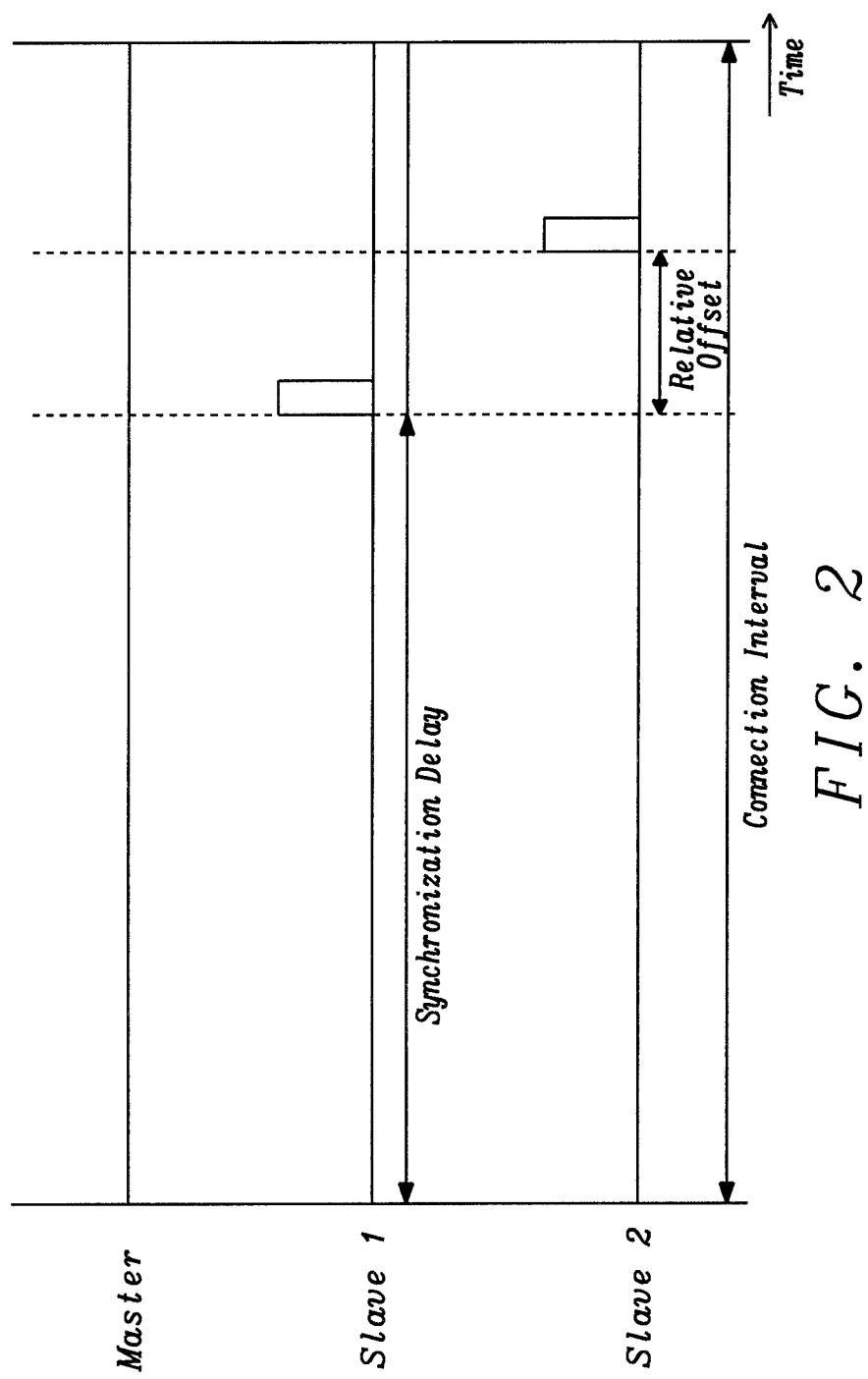
FIG. 2 is a schematic view of the communication timings of the devices in the network of FIG. 1.

As shown in FIG. 2, the synchronisation delay parameter is set such that it occurs at a latter stage of the connection interval. This is at a time when the master and slaves have finished sending and receiving packets.

Each of the hearing aids determines a synchronisation time point by adding the relative offset parameter to the synchronisation delay parameter. For the first hearing aid 20, the relative offset parameter is zero, and so the first synchronisation time point (STP1) is simply the time at which the synchronisation delay ends. For the second hearing aid 22, the relative offset parameter is non-zero (and positive), and so the second synchronisation time point (STP2) occurs after STP1.

At the end of the synchronisation delay (STP1), the first and second hearing aids wake up. If the first hearing aid 20 has any data or audio to send to the second hearing aid 22, it does so at this time.

At STP2, if the second hearing aid 22 has any data or audio to send to the first hearing aid 20, it does so at this time.

This is repeated for each connection interval. Synchronisation time points are calculated for each subsequent connection event.

Therefore, each of the slave devices are able to communicate with each other. The two slave devices have a set order for communication and so they will not "talk over" each other. Also, because they are communicating at a latter stage of the connection interval, this will not interfere with any communications sent by the master device.

Various modifications and improvements can be made to the above without departing from the scope of the invention.

What is claimed is:

1. A method of communication in a Bluetooth Low Energy network comprising a master device and a plurality of slave devices, comprising the steps of:
   sending from the master device to each of the slave devices a synchronisation delay parameter;
   sending from the master device to the each of the slave devices a relative offset parameter, said relative offset parameter being different for each of the slave devices;
   at each slave device, determining a synchronisation time point by adding the relative offset parameter to the synchronisation delay parameter; and
   wherein each slave device sends a communication to one or more other slave devices at its respective synchronisation time point, thus enabling communication between slave devices within a single Bluetooth Low Energy piconet.

2. The method as claimed in claim 1, including establishing a common connection interval for the master device and the slave devices.

3. The method as claimed in claim 2, including setting the synchronisation delay parameter such that it occurs at a latter stage of the connection interval.

4. The method as claimed in claim 2, including determining a synchronisation time point for each subsequent connection interval.

5. The method as claimed in claim 1, including sending from the master device to a slave device the synchronisation delay parameter during connection of the master device and said slave device.

6. The method as claimed in claim 1, wherein the relative offset parameter sent to a first slave device is set to zero.

7. The method as claimed in claim 1, wherein the communication sent from the first slave device to the second slave device comprises data.

8. The method as claimed in claim 1, wherein the communication sent from the first lave device to the second slave device comprises audio.

9. A Bluetooth Low Energy network comprising a master device and a plurality of slave devices, wherein:
   the master device is adapted to send to each slave device a synchronisation delay parameter and a relative offset parameter, said relative offset parameter being different for each of the slave devices;
   each slave device is adapted to determine its respective synchronisation time point by adding the device's relative offset parameter to the synchronisation delay parameter; and
   each slave device, at the synchronisation time point, sends a communication to one or more other slave devices, thus enabling communication between slave devices within a single Bluetooth Low Energy piconet.

10. The network as claimed in claim 9, wherein the master device is adapted to set the synchronisation delay parameter such that it occurs at a latter stage of an established connection interval.

11. The network as claimed in claim 9, wherein the communication sent between slave devices comprises data.

12. The network as claimed in claim 9, wherein the communication sent between slave devices comprises audio.

13. The network as claimed in claim 9, wherein one or more of the slave devices comprises a speaker.

14. The network as claimed in claim 9, wherein one or more of the slave devices comprises a hearing aid device.

* * * * *